L. A. M. HOOYMAN.
HANGER.
APPLICATION FILED AUG. 26, 1920.
1,382,509. Patented June 21, 1921.
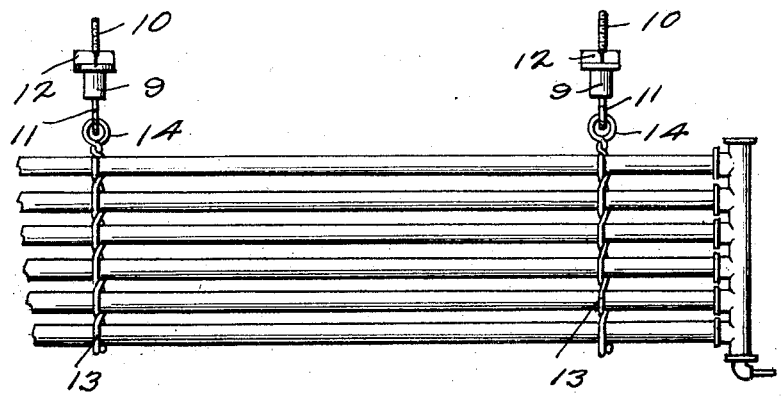
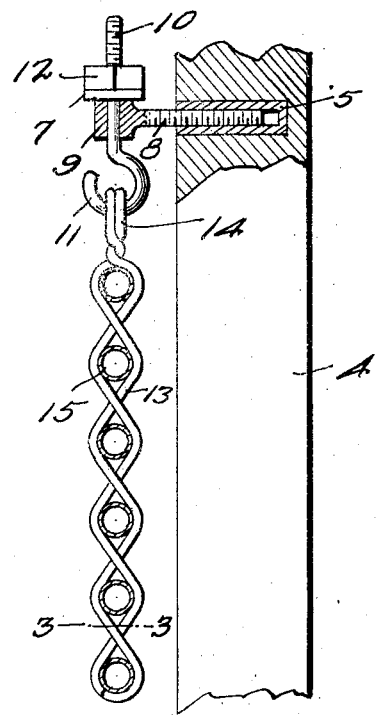
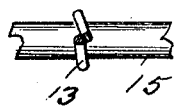
Witnesses
Inventor
Leonard A. M. Hooyman

UNITED STATES PATENT OFFICE.

LEONARD A. M. HOOYMAN, OF PASSAIC, NEW JERSEY.

HANGER.

1,382,509.

Specification of Letters Patent.  Patented June 21, 1921.

Application filed August 26, 1920.  Serial No. 406,074.

*To all whom it may concern:*

Be it known that I, LEONARD A. M. HOOYMAN, a citizen of the United States, residing at Passaic, in the county of Passaic and State of New Jersey, have invented certain new and useful Improvements in Hangers, of which the following is a specification.

This invention relates to hangers and has for a primary object the provision of a device which is especially adapted for supporting pipes.

Another object is to provide a support for steam pipes or the like, which are subject to expansion and contraction, the support being of such a nature as to be unaffected by these changes of the pipes, but nevertheless effectively retaining the pipes in the desired position.

A further object is to provide a flexible hanger which permits relative movement of the pipes, and to provide a detachable hanger which may be disengaged when desired.

The above and other objects of this invention will be in part described and in part understood from the following description of the present preferred embodiment of the invention taken in connection with the accompanying drawings, wherein:

Figure 1, is a side elevational view of a hanger constructed in accordance with my invention illustrating its application.

Fig. 2, is an end elevational view of the same a part thereof being shown in section, and Fig. 3, is a sectional view taken on the line 3—3 of Fig. 2, and looking in the direction of the arrow.

In order to illustrate the application of my invention a vertical supporting member 4 is shown which is provided with an opening in which a screw threaded barrel 5 is mounted.

The invention consists of suspension members generally designated 7 and consisting of a threaded shank 8, one end of which is provided with a cylindrical enlargement 9 through which a central bore is formed. The screw threaded shank 8 is arranged in the barrel 5 and has the head 9 thereof preferably extended an appreciable distance from the support 4. A bolt 10 is extended through the bore in the head 9 and has its lower end 11 formed to provide a hook. The opposite end is screw threaded and receives a washer 12 which engages the upper terminal of the head 9. The portion of the bolt which extends through the bore of the head 9 is smooth so as to permit vertical movement of the bolt through said head.

Pendently carried by the suspension members are pipe embracing elements 13, each of which consists of a strand of wire, an intermediate portion thereof being convoluted as indicated at 14 and engaged over one of the hooks 11. The opposite ends are alternately arranged over opposite sides of pipes 15, or other objects which are being supported. The lower ends of the strand are bent upwardly around the lowermost pipe and terminated at this point.

From the above it will be apparent that the pipes are detachably supported. Furthermore expansion and contraction of the pipes will be permitted without in any way interfering with the hanger or causing it to be subjected to undue strain. Moreover, the hanger is of a flexible nature so that in the event of objects coming in contact with the pipes, movement of the latter will not in any way distort the hanger. The device of this invention is therefore especially adapted for use in garages or the like where the moving vehicles occasionally engage the heating pipes, causing the hangers to be either broken or distorted and likewise impairing efficient use of the pipes.

What is claimed is:

A pipe hanger including a shank engaged with an object and provided with a head remote from the latter, a bolt extending through said head and having its lower end formed to provide a hook, a plurality of pipes and wire strands each of which is provided with a convolution to engage said hook and having the ends thereof alternately arranged on opposite sides of the pipes substantially as described.

In testimony whereof I affix my signature in presence of two witnesses.

LEONARD A. M. HOOYMAN.

Witnesses:
I. RUBIN,
THOMAS F. BLAKE.